141-232
7/7/87 SF 03 H 000,297

United States Statutory Invention Registration [19]

[11] Reg. Number: H297
[43] Published: Jul. 7, 1987

Schultz

[54] ROBOTIC REFUELING SYSTEM FOR TACTICAL AND STRATEGIC AIRCRAFT

[75] Inventor: Edwin R. Schultz, Waynseville, Ohio

[73] Assignee: The United States of America as represented by the Secretary of the Air Force, Washington, D.C.

[21] Appl. No.: 764,820

[22] Filed: Aug. 12, 1985

[51] Int. Cl.[4] ..... B64D 37/16; B60P 3/22
[52] U.S. Cl. ..... 141/232; 244/135 A; 901/41; 137/234.6; 137/899.1; 137/355.16
[58] Field of Search ..... 141/231-233, 141/981, 1, 392, 387, 388; 244/135 A; 901/6, 18, 41, 47; 414/8; 137/234.6, 357, 899.1, 899.2, 355.16, 355.2, 355.24

[56] References Cited

U.S. PATENT DOCUMENTS

| | | | |
|---|---|---|---|
| 1,869,487 | 8/1932 | Lefevre et al. | 244/135 A |
| 2,893,422 | 7/1959 | Schiltz | 137/355.17 |
| 2,941,761 | 6/1960 | Cox et al. | 244/135 A |
| 3,471,888 | 10/1969 | Grant et al. | 901/41 X |
| 3,527,268 | 9/1970 | Ginsburgh | 141/98 |
| 3,911,975 | 10/1975 | Van Soestbergen et al. | 141/95 |
| 3,917,196 | 11/1975 | Pond et al. | 244/175 |
| 4,076,131 | 2/1978 | Dahlstrom et al. | 901/41 X |
| 4,146,924 | 3/1979 | Birk et al. | 901/47 X |
| 4,219,847 | 8/1980 | Pinkney et al. | 901/47 X |
| 4,224,968 | 9/1980 | Bosser et al. | 141/284 |
| 4,262,696 | 4/1981 | Oury | 137/615 |
| 4,285,469 | 8/1981 | Hammelmann | 239/184 |
| 4,298,176 | 11/1981 | Kendall | 244/135 A |
| 4,327,784 | 5/1982 | Denniston | 141/387 |
| 4,380,696 | 4/1983 | Masaki | 901/47 X |
| 4,396,945 | 8/1983 | DiMatteo et al. | 901/47 X |
| 4,468,166 | 8/1984 | Jameson | 141/231 X |
| 4,500,065 | 2/1985 | Hennekes et al. | 901/41 X |
| 4,523,884 | 6/1985 | Clement et al. | 414/8 |
| 4,535,826 | 8/1985 | Bell | 141/231 |

FOREIGN PATENT DOCUMENTS

| | | | |
|---|---|---|---|
| 238584 | 7/1969 | U.S.S.R. | 141/232 |

*Primary Examiner*—Deborah L. Kyle
*Assistant Examiner*—Michael J. Carone
*Attorney, Agent, or Firm*—Donald J. Singer; Fredric L. Sinder; Thomas L. Kundert

[57] ABSTRACT

A ground-based aircraft refueling system uses existing air-to-air refueling technology. A fixed facility design attaches a moveable air-to-air type refueling boom and probe to an overhead track mounted on the ceiling of a TAB VEE aircraft shelter. Movement of the boom and probe is controlled from a remote control room protected from hazardous chemical and biological environments. In a second embodiment, a moveable facility design mounts on the top of a tank truck a first boom attached at a right angle to an air-to-air type refueling second boom and probe. The booms and probe are remotely controlled from the truck cab, which is protected from hostile chemical and biological environments. A third embodiment adds to the moveable facility design a second tank and nozzle outlet for spraying decontaminate.

2 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROBOTIC REFUELING SYSTEM FOR TACTICAL AND STRATEGIC AIRCRAFT

RIGHTS OF THE GOVERNMENT

The invention described herein may be manufactured and used by and for the Government of the United States for all governmental purposes without the payment of any royalty.

BACKGROUND OF THE INVENTION

This invention relates generally to the field of ground-based aircraft refueling systems, and more particularly to remotely controlled aircraft refueling systems for rapid aircraft turnaround and use in chemically and biologically hazardous environments.

Plans for future tactical and stategic aircraft needing rapid turn-around in hostile chemical and biological environments include requirements for innovative concepts exploiting new robotic and remote control servicing techniques. Today, aircraft ground servicing is still a highly manual process. To accomplish turn-around under combat conditions requires both manually operated equipment and substantial manpower located by the aircraft. Tests in servicing aircraft in a simulated hostile chemical and biological environment by ground crews wearing protective ensembles required twice the normal time, and the ground crews found the protective outfits hot and uncomfortable and wearable only for a short time. Therefore, current methods of ground-based refueling operations are unacceptable to meet future needs.

Air-to-air refueling has solved problems in providing for continuous operation of aircraft over long distances and for various types of missions. Air-to-air refueling is expensive, however, and is not suitable for all missions. It has provided, though, a tested and proven technology for rapid refueling and its existence and use ensures that all new fighter aircraft are, and will be, equipped with standardized facilities for semi-automatic refueling.

A typical air-to-air refueling system, such as on a F-15, has a fixed receptacle, a slipway, a hydraulically operated slipway door, and other event controls and lights. In operation, a self-aligning refueling probe extended from a tanker such as a KC-135, enters the slipway and moves into the receptacle where it is automatically latched into place by a hydraulic latching mechanism. Depending upon the type of tactical aircraft, fuel flows into the fuel manifold lines and into the fuel tanks at a rate of about 6,000 pounds per minute. The air refueling receptacle is normally located directly over the main feed tank, providing the potential for very rapid refueling. As the tanks are filled, float-operated valves automatically close the tank refueling valves, shutting off flow to the individual tanks. When the last valve closes, an increase in the fuel line pressure is sensed by a pressure switch which automatically provides a signal to unlatch the probe from the receptacle and to withdraw the probe, completing the refueling process.

The prior art shows at least one adaptation of the air-to-air refueling concept to take advantage of its technology. U.S. Pat. No. 4,327,784 to Denniston discloses an apparatus for refueling an aircraft from a ship at sea. The Denniston apparatus is a boom assembly mounted off the side of a ship and designed to maintain a constant position of the fuel outlet despite the pitch, roll, and heave movements of the ship in the water. Due to the relatively slow speed of ships, it is designed to be used only with aircraft capable of very slow speeds, such as vertical takeoff and landing (VTOL), or very short takeoff and landing (VSTOL) aircraft.

With the foregoing in mind, it is, therefore, a principal object of the present invention to provide an apparatus for ground-based remotely controlled aircraft refueling.

SUMMARY OF THE INVENTION

In accordance with the foregoing principles and objects of the present invention, a novel apparatus for a ground-based remotely controlled aircraft refueling system is disclosed which includes a fixed facility refueling apparatus comprising an aircraft shelter covering an overhead track upon which is mounted a remotely controlled extendable boom and refueling probe. Attached to the boom and shelter ceiling are closed circuit television cameras sending their signals to monitors in an environmentally protected control room from where the position, extension, pitch and yaw of the boom may be controlled.

The invention also includes a mobile refueling apparatus comprising a tank truck with a pivotly mounted extendable boom and refueling probe. Attached to the boom is a closed circuit television camera sending its signals to a monitor in an environmentally protected tank truck cab from where the position, extension, pitch and yaw of the boom may be controlled.

The invention further includes an addition to the mobile refueling apparatus comprising a second tank containing decontaminate operatively connected to an outlet mounted on the extendable boom.

BRIEF DESCRIPTION OF THE DRAWINGS

The present invention will be more clearly understood from a reading of the following detailed description in conjunction with the accompanying drawings.

DETAILED DESCRIPTION OF THE INVENTION

Figure 1:
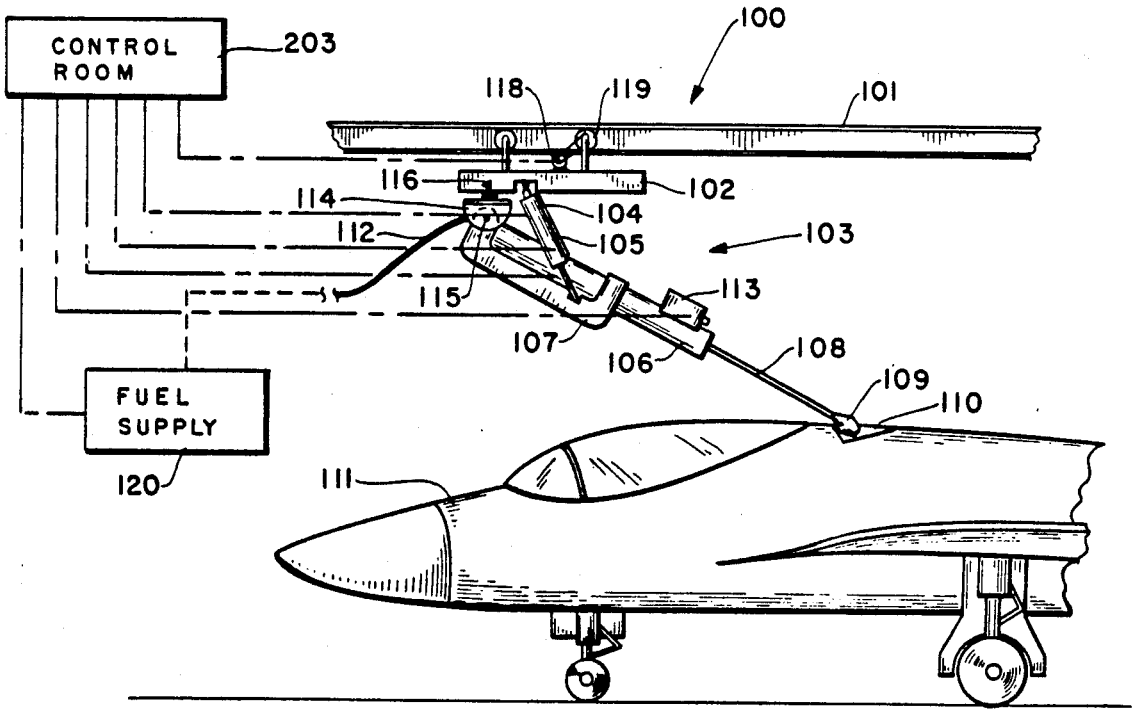
FIG. 1 is a partial side view of the interior of a fixed facility refueling apparatus incorporating the present invention.
Figure 7:
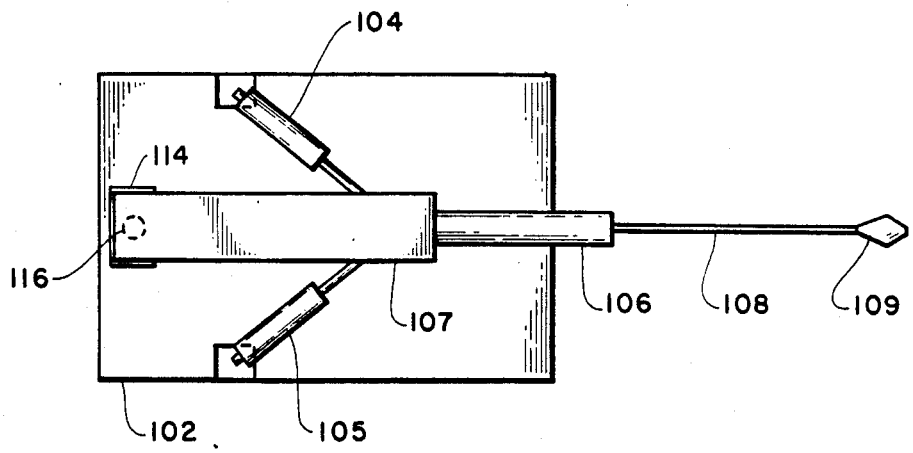
FIG. 7 is a representational view of the bottom of a trolley for carrying a fixed facility refueling appratus.

Referring now to FIG. 1 of the drawings there is shown a partial view of the interior of a fixed facility remotely controlled robotic refueling system 100. The relevant features of the refueling system 100 include an overhead track 101 upon which rides a wheeled trolley 102. A motor 118 drives the wheels 119 to move the trolley along the track 101. A probe boom assembly 103 is attached to the trolley 102 by a bracket 114 allowing the assembly 103 to rotate in the pitch plane about a first shaft 115, and to rotate in the yaw plane about a second shaft 116. The probe boom assembly 103 includes: hydraulic piston-and-cylinder units 104 and 105, which move the entire assembly 103 in pitch and yaw; a telescoping probe boom actuator 106; a probe boom support 107; a probe boom 108; and, a self-aligning probe 109. Piston-and-cylinder unit 104 is mounted identically to piston-and-cylinder unit 105 on the opposite side of the trolley 102 and is partially hidden behind piston-and-cylinder unit 105 in this view. As shown in the representational view of FIG. 7 of the bottom of trolley 102, trolley 102 is wider than probe boom support 107 so that the upper cylinder ends of piston-and-cylinder units 104 and 105 are spaced more widely apart than their lower piston ends. The self-aligning probe 109 fits into a slipway 110. Contracting or extending together both piston-and-cylinder units 104 and 105 will move probe boom assembly 103 in pitch. Due to the wider spacing at their upper cylinder ends, retracting one piston-and-cylinder unit while extending the other will cause probe boom assembly 103 to move in yaw located on the top of an aircraft 111. The probe boom assembly 103 carries jet fuel supplied by a schematically represented fuel supply 120 through a fuel line 112, then through the assembly 103 and the probe 109 to a receptacle above the aircraft 111 fuel tanks (the receptacle and fuel tanks are not shown). Mounted on the probe boom support is a closed circuit television camera 113 aimed along the length of the probe boom assembly 103 toward the probe 109. The piston-and-cylinder units 104 and 105, the probe boom actuator 106, the camera 113, the motor 118, and the fuel supply 120 are operatively interconnected with a schematically represented control room 203.

Figure 2:
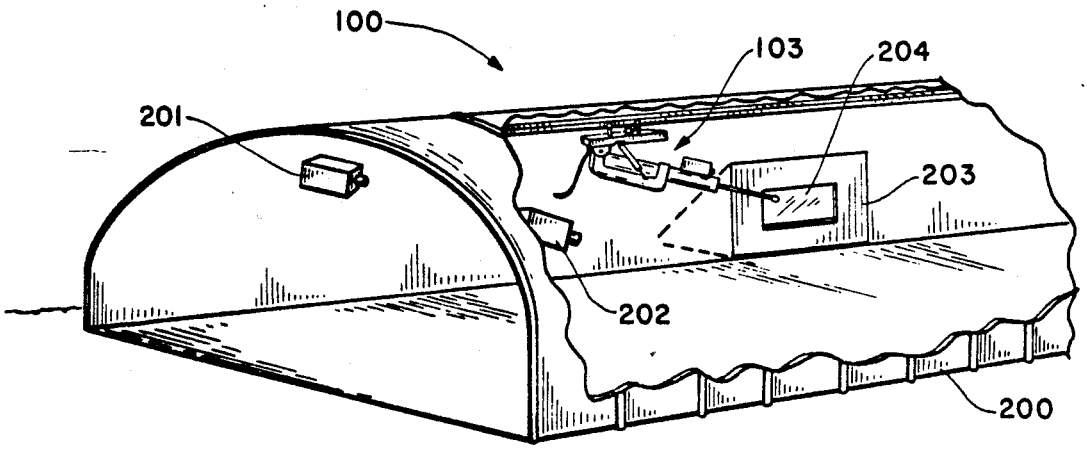
FIG. 2 is a perspective view of a TAB VEE type aircraft shelter incorporating a fixed facility refueling apparatus and an environmentally protected remote control room.

FIG. 2 shows a TAB VEE (Theater Air Base Vulnerability) type shelter 200. The shelter 200 differs from typical TAB VEE type shelters in that it is open on two ends so that an aircraft may enter and leave in one direction. Mounted on the inside of the roof of the shelter 200 is a remotely controlled robotic refueling system 100 as shown in FIG. 1. In addition to the components of the refueling system 100, there are two additional closed circuit television cameras 201 and 202 mounted from the underside of the shelter 200 roof. The video signals from cameras 113, 201 and 202 are sent to a human operator located in a control room 203. The control room 203 is protected from biological and chemical hazards in the environment by any number of methods and materials known in that art. Camera 113 is fitted with cross-hairs to help the operator align the probe boom in relation to the fuel tank receptacle. Cameras 201 and 202 provide information to the operator on the relative positions of the aircraft 111 and the probe boom assembly 103. The control room 203 preferably includes a window 204 providing a view from the control room 203 to the interior of the shelter 200 to aid alignment of the refueling probe 109 with the aircraft 111 slipway 110.

Figure 3:
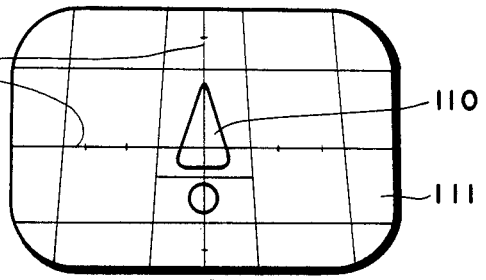
FIG. 3 is a view of an aircraft as seen though a mounted television camera showing the cross-hairs used to aim the refueling apparatus.

FIG. 3 is a view of the aircraft 111 through the camera 113 showing the cross-hairs 117 over the slipway 110 on the top of the aircraft.

In operation of the fixed facility refueling system 100, the aircraft 111 taxis into the shelter 200 to a position beneath the probe boom assembly 103. Using cameras 201 and 202, the operator remotely commands the motor 118 on the trolley 102 to move the probe boom assembly 103 into a position relative to the aircraft 111 similar to that shown in FIG. 1. Using the cross-hairs 117 on the probe boom actuator 106 mounted camera 113 as an aid, the operator commands the pitch and yaw controlling piston-and-cylinder units 104 and 105 to move the probe boom actuator 106 to align the probe boom 108 with the slipway 110. When the intersection of the cross-hairs 117 are over the slipway 110, the operator then commands the probe boom actuator 106 to extend the probe boom 108 until the self-aligning probe 109 enters the slipway and moves into the refueling receptacle. Engagement of the receptacle automatically initiates fuel flow and the operation proceeds as in an air-to-air refueling operation. After the last tank is filled, the increased fuel pressure shuts down the fuel flow and causes an automatic probe retraction. The operator then commands the pitch and yaw piston-and-cylinder units 104 and 105, and the probe boom actuator 106, to move the probe boom assembly 103 into the stowed position similar to that shown in FIG. 2. Finally, the refueled aircraft taxis out of the shelter.

The fixed facility refueling system shown may be modified in various ways. For instance, the upper attachment points for piston-and-cylinder units 104 and 105 may be moved forward on trolley 102, and the probe boom support 107 shortened to move the lower attachment points for piston-and-cylinder units 104 and 105 rearward. Such an arrangement provides an ability for the probe boom assembly to act as an over-center lock when the piston-and-cylinder units are fully contracted, allowing the probe boom assembly to lock in a stowed position without regard for loss of hydraulic pressure.

Figure 4A:
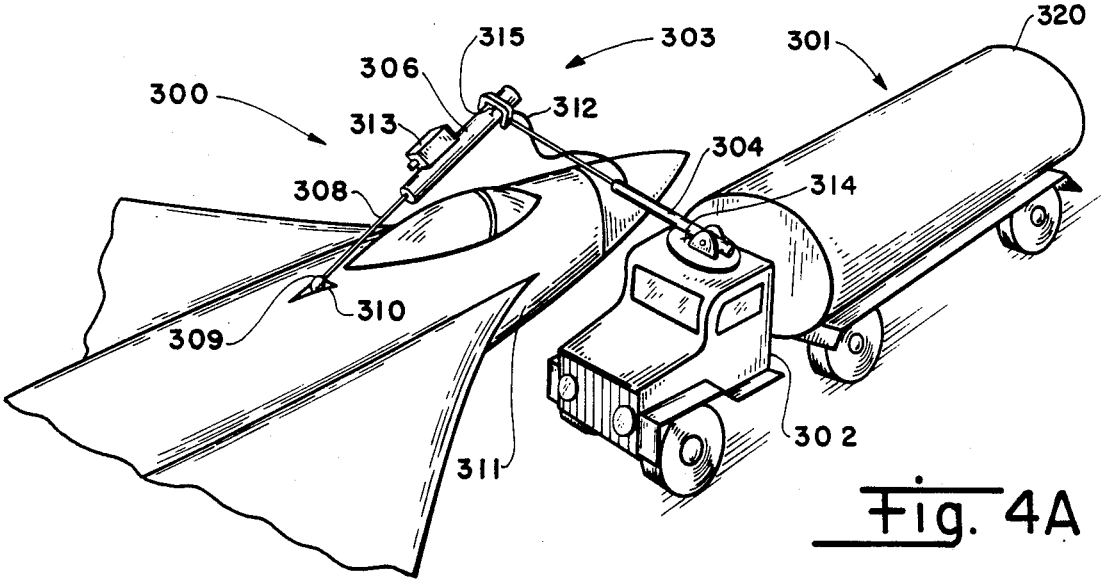
FIG. 4A is a perspective view of a tank truck incorporating a mobile refueling apparatus.
Figure 4B:
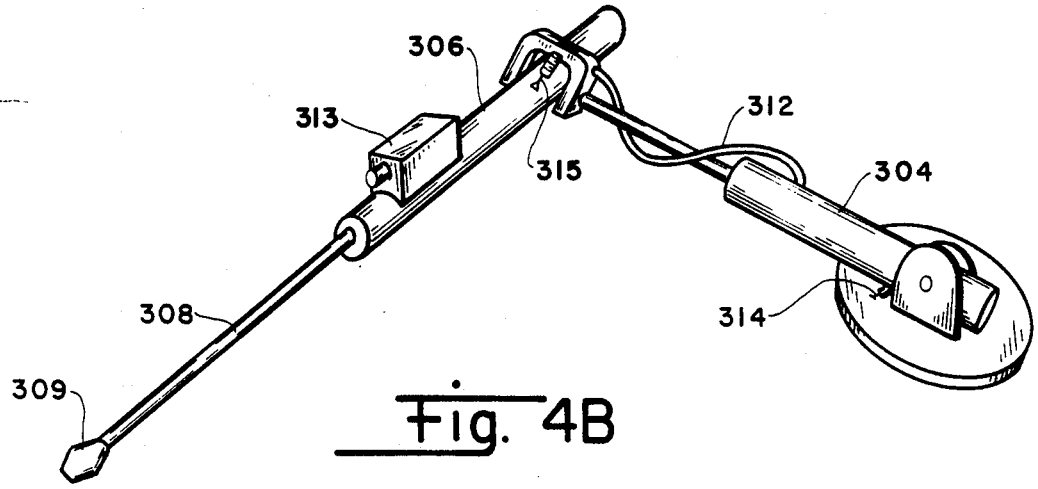
FIG. 4B is a perspective view of the mobile refueling apparatus boom assembly shown in FIG. 4A enlarged to show better detail.

Referring now to FIGS. 4A and 4B, there is shown another embodiment of the invention comprising a mobile robotic refueling system 300. A fuel tank truck 301 has rotatably attached to the roof of its environmentally protected cab 302 a probe boom assembly 303. The probe boom assembly 303 includes a telescoping main support strut 304 moveably attached at a right angle to a telescoping probe boom actuator 306. The probe boom actuator extends a probe boom 308 which is connected at its end to a self-aligning probe 309. The probe 309 fits into a slipway 310 located on the top of an aircraft 311. The main support strut 304 may be moved in its pitch plane by action of a telescoping piston-and-cylinder unit 314. The probe boom actuator 306 may be moved in its pitch plane by action of a telescoping piston-and-cylinder unit 315. A motor (not shown) rotates the entire probe boom assembly 303 in horizontal yaw about its attachment point. A closed circuit television camera 313, having on its lens crosshairs substantially identical to the crosshairs 117 shown in FIG. 3, is mounted to the probe boom actuator 306. The video signal from the camera 313 is sent to a monitor inside the cab 302 in view of the truck 301 and refueling system 300 operator. A fuel hose 312 connects the probe 309 to a portable fuel supply 320, including a fuel tank and pumps, which is mounted on the tank truck 301.

In use, the mobile refueling system 300 pulls up parallel to the aircraft 311 with the refueling operator in full view of the probe boom 308 and aircraft refueling slipway 310. Using the cross-hairs on the lens of the camera 313 to aid final alignment, the operator manipulates appropriate controls to command the actuating mechanisms to engage the probe 309 with the slipway 310. Engagement of the probe 309 with a fuel tank receptacle beneath the slipway 310 initiates fuel flow, which, as in the fixed facility refueling system, terminates automatically when the tanks are full.

The mobile refueling system may be modified to provide additional features. For example, the attachment of the main support strut 304 to the boom actuator 306 may be designed to allow the boom actuator 306 to fold to a position substantially parallel to that of the main support strut 304. This will allow the entire probe boom assembly to be conveniently stowed on the top of the tank truck.

Figure 5:
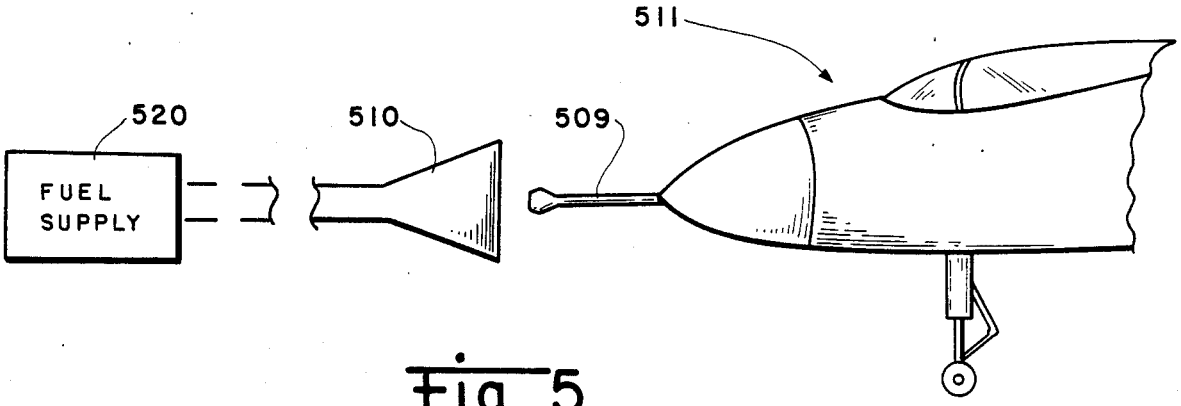
FIG. 5 is a representative side view of a drogue and probe type air-to-air refueling connection.

FIG. 5 shows an partial side view of a drogue and probe type of air-to-air refueling apparatus. A probe 509 is attached to an aircraft 511. For refueling, the probe 509 enters a drogue 510 connected to a fuel supply 520. It will be seen by those in the art that the embodiments thus far shown may be easily modified to substitute a drogue and probe type refueling mechanism for a probe and slipway.

Figure 6:
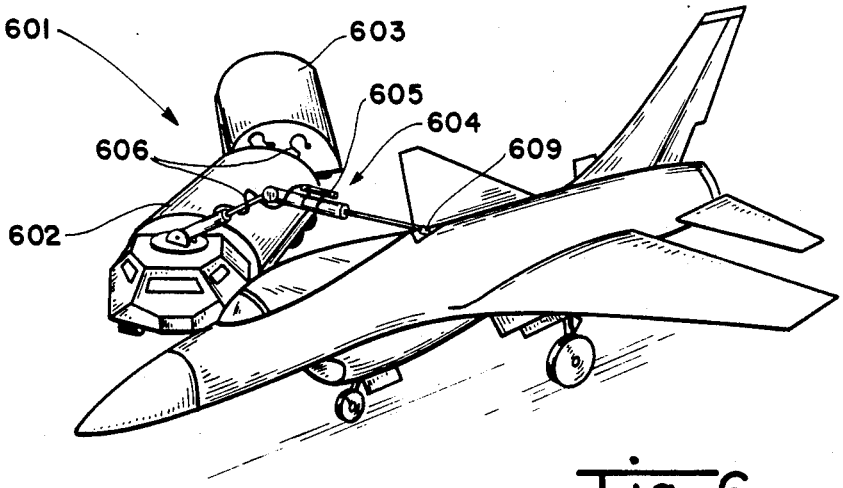
FIG. 6 is a perspective view of a tank truck incorporating a combination mobile refueling and decontaminate apparatus.

Referring now to FIG. 6 of the drawings, there is shown another embodiment of a mobile facility refueling system. A newer design fuel tank truck 601 includes a first tank 602 for fuel, and a second tank 603 for liquid decontaminates. Mounted on a boom assembly 604 is a nozzle 605 operatively interconnected through a hose 606 to the second tank 603. The decontaminate nozzle is used to spray, for example, biological and chemical decontaminates over the aircraft after a final sortie, to spray decontaminates over protectively clothed ground crews, to spray decontaminates over objects other than aircraft, and to spray, when required, decontaminates over the slipway opening prior to inserting a probe 609.

It is understood that certain modifications to the invention as described may be made, as might occur to one with skill in the field of this invention. Therefore, all embodiments contemplated have not been shown in complete detail, and other embodiments may be developed without departing from the spirit of this invention or from the scope of the appended claims.

I claim:

1. A fixed facility aircraft refueling apparatus, comprising:

(a) a covered structure sufficiently large whereby an aircraft may pass beneath it, the structure having a ceiling and a aligned entrance and exit so that an aircraft may enter and exit along a substantially straight line of travel:

(b) an overhead track attached to the structure;

(c) a trolley suspended from the overhead track;

(d) means for moving the trolley along the overhead track;

(e) a telescoping boom having a first end and a second end, the boom pivotally connected at its first end to the trolley;

(f) a pair of telescoping piston-and-cylinder units connecting the boom and trolley controllably moving the boom in pitch and in yaw;

(g) an aircraft self-aligning refueling probe attached to the second end of the boom;

(h) a fuel supply;

(i) a fuel hose operatively interconnecting the fuel supply and the self-aligning refueling probe;

(j) a first video camera mounted on the boom;

(k) a lens with cross-hairs mounted to the first video camera;

(l) a second video camera mounted to the ceiling of the structure; and, (m) a control room having means operatively interconnecting the control room with the trolley, the trolley moving means, the telescoping boom and the piston-and-cylinder units, the control room further having means for protecting its interior from environmental hazards.

2. The aircraft refueling apparatus according to claim 1, wherein said probe is characterized as an aircraft refueling drogue.

* * * * *